United States Patent [19]

Saccavino et al.

[11] 4,294,716
[45] Oct. 13, 1981

[54] HALOCARBON AND AZEOTROPE REFRIGERANT COMPOSITIONS CONTAINING OFFENSIVE WARNING COMPONENT

[76] Inventors: Joseph F. Saccavino, W. Branch Rd., Mahopac, N.Y. 10541; Edward A. Vanek, 964 Cedarhurst St., North Woodmere, N.Y. 11581

[21] Appl. No.: 149,163

[22] Filed: May 14, 1980

[51] Int. Cl.$^3$ .................. C09K 5/00; C10M 01/30
[52] U.S. Cl. .......................................... 252/68; 252/67
[58] Field of Search ............... 252/67, 68, 69, 408 R; 48/195; 44/52, 59

[56] References Cited

U.S. PATENT DOCUMENTS 3,169,839  2/1965  Calva ................................ 48/195
3,545,949  12/1970  Oister ............................... 48/195

FOREIGN PATENT DOCUMENTS 9902 11/1928 Australia .
2756655 6/1978 Fed. Rep. of Germany .

*Primary Examiner*—P. E. Willis, Jr.
*Attorney, Agent, or Firm*—Anthony J. Casella

[57] ABSTRACT

This invention deals with the identification of materials which can be used as an odorant for halocarbons and azetropes, primarily chlorofluorocarbons, commonly used as refrigerants in refrigeration, airconditioning and process cooling systems. Refrigerants containing less than 2% by weight of an inert volatile compound having an offensive odor unobjectionably attracts the attention of the human olfactory senses when a refrigeration system containing such a refrigerant develops a leak. The offensive odor acts as a warning signal and permits the refrigerant leaks to be detected and remedied as they occur, thereby decreasing the quantity of refrigerant that would otherwise be lost, as well as preventing loss of perishables, uncomfortable or unworkable surroundings, damage to sensitive equipment, increased use of electrical energy, and possible incremental damage to the stratosheric ozone layer.

1 Claim, No Drawings

HALOCARBON AND AZEOTROPE REFRIGERANT COMPOSITIONS CONTAINING OFFENSIVE WARNING COMPONENT

A refrigeration system generally consists essentially of a compressor used as the prime mover to increase and decrease the pressure as follows: increase the temperature of the low pressure gas returned from the evaporator by compression, so that this gas can give up its heat to a lower temperature and then can be condensed back into a liquid via an air or water cooled condenser. The liquid is then contained in a receiver at the higher pressure which is required for the liquid to flow through an expansion device into an evaporator as a saturated vapor at a reduced pressure for the sole purpose of extracting heat within the space being conditioned.

Refrigeration systems find their largest use in the preservation of perishable foods, comfort air conditioning and process cooling. Typically these systems contain from one pound to several thousand pounds of refrigerant, and leakage of the refrigerant is a frequent occurrence. The leakage of refrigerant is usually caused by failure of sweated or threaded joints, gasket material, flare or compression connections, seals, and is due to inherent expansion, contraction, vibration and chafing. Since the refrigerant is colorless, odorless and volatile, leaks usually pass unnoticed until most of the refrigerant has been lost to the atmosphere and the temperature of the product has risen to the point whereby the foodstuffs have begun to spoil (when the unit is used for food preservation) or when the environment has become uncomfortably warm (when the unit is used for air conditioning) or when computer equipment fails (when the unit is used for process cooling). Loss of refrigerant is serious because the refrigerant itself is costly, and when the unit is used for food preservation the loss of food may be even more costly.

The above-described problem is recognized in Williams U.S. Pat. No. 1,915,965, which adds a basic dye to the refrigerant, which stains the exterior surfaces of the refrigeration system when leakage occurs. However, this method of detecting leaks requires regular inspection of the entire system for stains and experience has shown that often the inspections are neglected and that often major leaks occur between inspections. Moreover, the tell-tale stains are often concealed because many of the component parts are not readily visible and are overlooked despite inspection. The Williams patent further proposes introducing a powerful pleasant perfume into the refrigerant as warning agent. This potentially would not be successful because most persons do not associate a pleasant odor with leakage of a refrigerant.

The present invention is based on the concept of introducing into the refrigerant (during manufacture) an unpleasant-smelling odorant as warning agent, which will cause an immediate awareness of any leakage of refrigerant. The invention is further based on the provision of an unpleasant-smelling component as warning agent which would satisfy a number of criteria, as follows:

(1) The odorant must *vaporize* along with the halocarbons and azeotropes. This is necessary: (a) to carry the odorant from the liquid to the vapor phase during use of the refrigerant and, hence, to assure its even distribution throughout the system; and (b) to assure its presence in the atmosphere surrounding the system in the event of a leak.

(2) The odorant must have a *noticeable odor*. Definition of what constitutes a noticeable odor is, of course, a subjective matter since all persons will differ in their response to various odors, both with respect to the type of odor and the concentration of odorant in the vapor space. In addition, both the immediate environment and the olfactory experiences of the observer in the time just prior to contact with the odorant will affect that person's ability to notice such a material.

(3) The odorant is *compatible* and *non-reactive* with not only the halocarbon and azetrope refrigerant, but also with the variety of metals, varnishes, and lubricants normally found in modern refrigeration systems. The publication "Sealed-Tube Stability Tests on Refrigeration Materials", H. M. Parmlee; presented to ASHRAE; reprint from E. I. duPont de Nemours & Co. discussed the requirements of compatibility of refrigerants and the system components.

(4) The odorant is of such a nature that once the leak has been sealed, it will not remain as a *pervasive, obnoxious odor,* preventing the normal use of the refrigeration system, its surroundings and the units it serves.

The discovery has now been made that the above-stated criteria are realized when the refrigerant has a small predetermined content of one or more of the agents listed below. It has been found that these compounds, when present alone or in compatible admixture to the extent of up to 2% by weight provide the desired warning effect and meet the foregoing criteria when the refrigerant is vaporized. Since all the common halocarbon and azeotrope refrigerants bear a close similarity, one to the other, in terms of their chemical and physical behavior, it is, therefore, permissible to conclude that a demonstration of odorant behavior with one of them, e.g. Refrigerant 12, as used in the Example set forth below, will be valid for the rest of this class of refrigerants. The halocarbon and azeotrope refrigerants involved in the present invention are known to be extremely stable. Of the several hundred thousand known organic chemicals, only a relatively few of them could be classified as odorants in the terms of this usage, i.e., soluble in halocarbons and azeotropes, vaporizable under use and/or leakage conditions, non-reactive with the refrigeration system, bearing noticeable odors and being non-pervasive and non-toxic. Even so, the list of compounds is very long and numerous materials might well be included, subject to further test as to whether they are, in fact, reactive or toxic and, therefore, subject to exclusion from further consideration.

A partial list of potential odorants (based on reactivities and odors) presently known is:

| | |
|---|---|
| acetic acid | acetonitrile |
| allyl acetate | allyl alcohol |
| allyl chloride | allyl isothiocyanate |
| allyl methyl sulfide | allyl mercaptan |
| allyl sulfide | amyl acetate |
| amyl alcohol | benzyl methyl sulfide |
| butyl alcohol | butyl mercaptan |
| butyl sulfide | butyric acid |
| t-butylacetic acid | butyl isocyanide |
| cadaverine | caproic acid |
| carbon disulfide | citral nitrile |
| cycloheptanone | cyclobutanecarboxylic acid |
| cyclohexanone | 3-chloropropylthio-lacetate |
| cyclopentanone | dimethylamino-2- |

| -continued | |
|---|---|
| dimethylaminoacetone | butanone |
| ethylacetoacetate | diethylamino-2-butanone |
| ethyl caproate | ethyl butyrate |
| ethyl sulfide | ethyl mercaptan |
| hexyl sulfide | ethyl pyridine |
| indole | hydroxyethyl disulfide |
| methyl ethyl ketone | methylindole |
| methyl-cyclohexanone | methyl iso-butyl ketone |
| methyl mercaptan | methyl-cyclohexene |
| methyl disulfide | methyl sulfide |
| quinoline | pyridine |
| | methyl cresotinate |

In the subject invention, the warning component does not function as a refrigerant in most instances and so, to the extent that the warning agent is present, it insignificantly decreases the efficiency of the refrigeration cycle.

Practically all the warning gases are capable of causing physiological harm when breathed in high concentrations for protracted periods of time. Accordingly, the total amount of the warning agent in the refrigerant compositions of the present invention is sufficiently low so that the toxic level for the component as a gas diffused in to the atmosphere will not be exceeded if all the refrigerant composition should be released by leakage into the atmosphere. The present invention does not contemplate or require the presence of an amount of warning agent in a refrigerant which foreseeably might cause physiological harm. In the specification and claims, therefore, the term "toxic" designates the toxicity of the warning agent after it has leaked from the refrigeration system and has evaporated into the atmosphere in the usual way.

If desired, the warning agent composition can be added in appropriate amounts to an existing refrigeration system presently in operation. The refrigerant compositions of the present invention can contain such other materials as are customarily present in refrigeration compositions including dyes, pigments and fluoroescent materials for identification or for trademark purposes, and lubricants.

The invention is further described in the example which follows, said example being best embodiments of the invention and are not to be construed in limitation thereof.

EXAMPLE

The following illustrates the preparation and warning properties of refrigerant compositions of the present invention under conditions simulating normal leakage of the refrigerant into the atmosphere. In each instance a refrigerant composition containing 2% max by weight of a warning agent or mixture of warning components is used.

Tests were conducted in which the various compounds listed in the table below were dissolved in Dichlorodifluoromethane (Refrigerant 12) and the vapor resulting from subsequent boil-off of the halocarbon was "sniff tested" to detect the presence of the odorant.

These tests were performed by:
(a) placing the odorant in a screw-cap bottle;
(b) cooling the bottle to −20 to −30% C, while closed to avoid the entry of moisture;
(c) adding the requisite amount of halocarbon (Refrigerant 12, as packaged for re-charging of automatic air-conditioners);
(d) allowing the bottle, with a loosened cap, to stand at room temperature until the refrigerant began to boil; and then
(e) "sniff testing" the vapors exiting from the bottle.

A control test, in which only the Refrigerant was placed in the test bottle, had only a slight vapor odor, similar to that of carbon tetrachloride. The results of the tests are tabulated below:

| Odorant Name | Weight (g) | Refrig't (g) | Weight % Odorant | "Sniff Test" Result | Comment |
|---|---|---|---|---|---|
| Methyl Cresotinate | 0.2 | 40 | ½ | positive | weak |
| Methyl Cresotinate | 0.4 | 25 | 1½ | " | weak |
| Ethyl Butyrate | 0.2 | 20 | 1 | " | weak |
| Ethyl Butyrate | 0.2 | 40 | ½ | " | weak |
| Citral Nitrile | 0.2 | 20 | 1 | " | weak |
| Cyclohexanone | 0.4 | 20 | 2 | " | weak |
| Cyclohexanone | 0.4 | 40 | 1 | " | weak |
| Cyclopentanone | 0.4 | 20 | 2 | " | weak |
| 3-Methyl-Cyclohexanone | 0.4 | 20 | 2 | " | fairly strong |
| 3-Methyl-Cyclohexanone | 0.4 | 40 | 1 | " | |
| Hexane-1 | 0.4 | 20 | 2 | " | very weak |
| Methyl isobutyl ketone | 0.4 | 20 | 2 | " | fairly strong |

The tests performed established that an odorant can be dissolved in a halocarbon and then be detected in the vapor resulting from vaporization of this solvent. Hence, the odorant will be carried into the vapor phase along with the refrigerant during the boil-off. Given the proper odorant, i.e., one having a sufficiently noticeable odor and which is not inactivated by reaction with the system or the refrigerant, it is also possible to detect a leak of refrigerant by olfactory sensing.

We claim:
1. A refrigerant composition comprising:
a substantially odorless chlorofluorocarbon;
an odorant component, said component being not more than 2% by weight of the composition, said component being inert, volatile and soluble in said chlorofluorocarbon, said component being an organic ketone selected from the group consisting of 3-Methyl-Cyclohexanone and Methyl Isobutyl Ketone, said refrigerant composition adapted for use in a refrigeration system whereby any leaks which develop in said system can be readily detected due to the noticeable and pervasive odor resulting from the vaporation of said odorant component such that said leak may be rapidly repaired preventing continued operation of said refrigeration system at reduced efficiency.

* * * * *